(12) United States Patent
Lutze et al.

(10) Patent No.: US 10,287,030 B2
(45) Date of Patent: May 14, 2019

(54) CONVERTER WITH REDUNDANT CIRCUIT TOPOLOGY

(71) Applicant: SIEMENS AKTIENGESELLSCHAFT, München (DE)

(72) Inventors: Marcel Lutze, Nürnberg (DE); Markus Pfeifer, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/324,540

(22) PCT Filed: May 29, 2015

(86) PCT No.: PCT/EP2015/061932
§ 371 (c)(1),
(2) Date: Jan. 6, 2017

(87) PCT Pub. No.: WO2016/005101
PCT Pub. Date: Jan. 14, 2016

(65) Prior Publication Data
US 2017/0197730 A1 Jul. 13, 2017

(30) Foreign Application Priority Data

Jul. 9, 2014 (DE) .......... 10 2014 213 307
Apr. 20, 2015 (DE) .......... 10 2015 207 117

(51) Int. Cl.
*B64D 47/00* (2006.01)
*H02M 5/458* (2006.01)
(Continued)

(52) U.S. Cl.
CPC .......... *B64D 47/00* (2013.01); *B64D 27/24* (2013.01); *H02K 19/34* (2013.01); *H02M 5/458* (2013.01);
(Continued)

(58) Field of Classification Search
CPC .. H02J 1/102; H02J 3/36; B64D 47/00; B64D 27/24; B64D 2221/00; B64D 2027/026;
(Continued)

(56) References Cited

U.S. PATENT DOCUMENTS 5,023,537 A * 6/1991 Baits ............. F02N 11/04
290/4 R
6,894,418 B2 5/2005 Jones et al.
(Continued)

FOREIGN PATENT DOCUMENTS

DE 102006031662 A1 1/2008
DE 102012219243 A1 4/2014
(Continued)

OTHER PUBLICATIONS

Cao, W. et al.: "Overview of Electric Motor Technologies Used for More Electric Aircraft (MEA)"; IEEE Transactions on Industrial Electronics; Bd. 59; Nr. 9; pp. 3523-3531; 2012.

*Primary Examiner* — Daniel Kessie
*Assistant Examiner* — Terrence R Willoughby
(74) *Attorney, Agent, or Firm* — Henry M. Feiereisen LLC

(57) ABSTRACT

A converter for an aircraft includes an intermediate circuit for providing a DC voltage between a positive line and a negative line, at least two rectifiers connected to the intermediate circuit to produce the DC voltage from input AC voltages and at least two inverters connected to the intermediate circuit to produce AC output voltages from the DC voltage. The DC voltage terminals of the rectifiers are connected to a first series circuit and the DC voltage terminals of the inverters are connected to a second series circuit. The positive line and the negative line of the intermediate circuit are connected on an input side via the first series circuit and on the output side via the second series circuit. At least one of the DC voltage terminals includes a
(Continued)

short circuit for short-circuiting terminal contacts by which the DC voltage terminal is connected to the respective series circuit.

11 Claims, 5 Drawing Sheets

(51) Int. Cl.
| | |
|---|---|
| *H02M 7/25* | (2006.01) |
| *H02M 7/5387* | (2007.01) |
| *B64D 27/24* | (2006.01) |
| *H02K 19/34* | (2006.01) |
| *H02P 27/06* | (2006.01) |
| *H02M 3/158* | (2006.01) |
| *H02M 1/00* | (2006.01) |
| *H02M 1/32* | (2007.01) |
| *B64D 27/02* | (2006.01) |

(52) U.S. Cl.
CPC ........... *H02M 7/25* (2013.01); *H02M 7/5387* (2013.01); *H02P 27/06* (2013.01); *B64D 2027/026* (2013.01); *B64D 2221/00* (2013.01); *H02M 3/1588* (2013.01); *H02M 2001/0074* (2013.01); *H02M 2001/325* (2013.01); *Y02B 70/1466* (2013.01)

(58) Field of Classification Search
CPC ........ H02P 27/06; H02K 19/34; H02M 5/458; H02M 7/25; H02M 7/5387; H02M 2001/0074; H02M 2001/325; H02M 3/1588; Y02B 70/1466
See application file for complete search history.

(56) References Cited

U.S. PATENT DOCUMENTS

| | | | |
|---|---|---|---|
| 9,362,839 B2* | 6/2016 | Wei | H02M 5/4585 |
| 2007/0230226 A1* | 10/2007 | Lai | H02M 5/4585 363/65 |
| 2008/0007973 A1* | 1/2008 | Schreiber | H02M 3/1582 363/2 |
| 2008/0284249 A1* | 11/2008 | Datta | H02J 1/06 307/36 |
| 2008/0308685 A1* | 12/2008 | Decker | B64C 11/305 244/53 R |
| 2010/0201338 A1* | 8/2010 | Haj-Maharsi | H02M 1/4233 323/305 |
| 2010/0225193 A1 | 9/2010 | Clark | |
| 2013/0010504 A1* | 1/2013 | Xiao | H01F 3/12 363/35 |
| 2015/0276875 A1 | 10/2015 | Hornstein et al. | |

FOREIGN PATENT DOCUMENTS

| | | |
|---|---|---|
| EP | 1876696 A2 | 1/2008 |
| EP | 2608383 A1 | 6/2013 |
| EP | 2608397 A1 | 6/2013 |
| WO | WO 2007084041 A1 | 7/2007 |
| WO | WO 2013092046 A2 | 6/2013 |

* cited by examiner

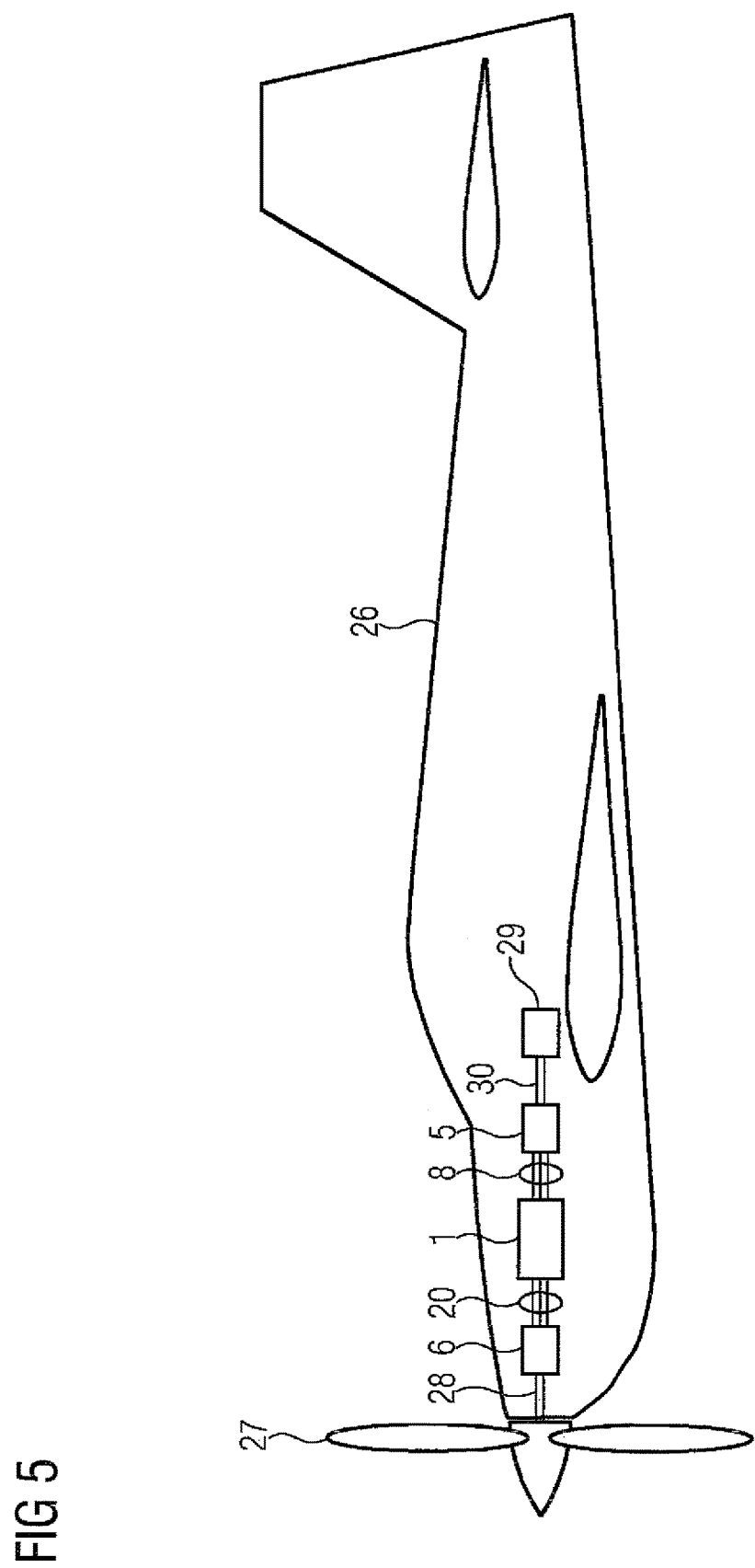

CONVERTER WITH REDUNDANT CIRCUIT TOPOLOGY

CROSS-REFERENCES TO RELATED APPLICATIONS

This application is the U.S. National Stage of International Application No. PCT/EP2015/061932, filed May 29, 2015, which designated the United States and has been published as International Publication No. WO 2016/005101 A1 which claims the priorities of German Patent Applications, Serial No. 102014213307.6, filed Jul. 9, 2014, and Serial No. 102015207117.0, filed Apr. 20, 2015, pursuant to 35 U.S.C. 119(a)-(d).

BACKGROUND OF THE INVENTION

The invention relates to a converter for an aircraft. The converter has a DC link via which multiple rectifiers are coupled to multiple inverters. The invention also includes an aircraft having the converter according to the invention.

Converters in electrically driven aircraft require a redundancy concept. The redundancy can be produced by a parallel connection comprising multiple inverters and active rectifiers. In a parallel connection, the flow of power needs to be controlled via contactors, however. The reason is that in the event of a fault, the faulty assembly is disconnected from the drive system via the contactors. The high currents needing to be switched mean that the contactors are very large in terms of their physical form, however. The weight of the contactors is disadvantageous for use in aircraft.

SUMMARY OF THE INVENTION

The invention is based on the object of providing a redundant converter for an aircraft that has a compact physical form.

The object is achieved by the subjects of the independent patent claims. Advantageous developments of the invention are provided by the features of the dependent patent claims.

The invention comprises an aircraft converter, i.e. a converter for an aircraft. The converter has a DC link for providing a DC voltage between a positive line and a negative line. The input side of the DC link has at least two rectifiers connected to it that are designed for producing the DC voltage from input AC voltages. The input AC voltages can be received from a polyphase, for example a three-phase, supply system, for example a generator. The rectifiers may be passive or active rectifiers. The output side of the DC link has at least two inverters connected to it that are designed for producing output AC voltages from the DC voltage. The output AC voltages of an inverter can form a polyphase voltage system, particularly a three-phase voltage system.

So as now to be able to design the converter compactly, the invention provides for DC voltage connections of the rectifiers to be interconnected to form a first series connection. The DC voltage connection of a rectifier is its DC voltage output. Furthermore, DC voltage connections of the inverters are interconnected to form a second series connection. The DC voltage connection of an inverter is its DC voltage input. The rectifiers and the inverters are therefore each connected to the DC link not in parallel with one another, but rather in a series connection. The positive line and the negative line of the DC link have their input sides connected to one another via the first series connection, i.e. via the rectifiers, and have their output sides connected to one another via the second series connection, i.e. via the inverters. At least one of the DC voltage connections has a shorting circuit for shorting connection contacts of the DC voltage connection. Via the connection contacts, the DC voltage connection is connected to the respective series connection. By closing the shorting circuit, the connection contacts are shorted. In other words, the respective rectifier or inverter is then ineffective in the series connection. By opening the shorting circuit, the current flowing through the series connection is routed via the rectifier or the inverter.

The invention results in the advantage that connecting or disconnecting a rectifier or inverter in the DC voltage DC link requires only a simple shorting circuit instead of contactors that need to be able to connect polyphase AC voltage lines and DC voltage lines, as is the case for the parallel connection of rectifiers and inverters.

The invention also includes developments whose features result in additional advantages.

According to one development, the shorting circuit in the case of at least one DC voltage connection, which may be provided in an inverter or in a rectifier, is formed by a semiconductor switch S1 that connects the connection contacts of the DC voltage connection. In the context of the invention, a semiconductor switch is intended to be understood generally to mean particularly an IGBT (insulated-gate bipolar transistor) or a MOSFET (metal oxide semiconductor field effect transistor). The development results in the advantage that a single semiconductor switch suffices to decouple the rectifier or inverter from the series connection.

Another development provides for the shorting circuit in the case of at least one of the inverters to be formed by a half-bridge that is also provided for producing the output AC voltages. Thus, a separate semiconductor switch is not used. The half-bridge is connected between the connection contacts of the DC voltage connection and can likewise be used for shorting the connection contacts. In this case, however, there is additional provision for AC voltage outputs of the inverter, via which AC voltage outputs the output AC voltage can be transmitted to an electrical load, likewise to be prepared for the short. In this regard, there is provision for the AC voltage outputs additionally each to have a semiconductor switch provided at them for blocking a current when the shorting circuit is closed. In other words, in the case of the half-bridge, the contact point between the semiconductor switches of the half-bridge is coupled to the connected load via a further semiconductor switch. This results in the advantage that when the shorting circuit is closed, that is to say when the half-bridge is fully switched to an electrically conductive state and the connection contacts are shorted as a result, no current can drain into the electrical load. This prevents, by way of example, an electrical load from continuing to be electrically connected to the inverter.

One development uses the targeted or controllable connection and disconnection of an inverter or a rectifier via the shorting circuit. When a half-bridge is defective, the associated rectifier or inverter is decoupled from the DC link during operation of the converter. In this development, at least one of the rectifiers and/or at least one of the inverters has respective multiple half-bridges that each have at least two semiconductor switches. A control device 22 is designed to detect a defective semiconductor switch in the half-bridges that is switched permanently to an electrically conductive state, i.e. remains in the electrically conductive state. For a semiconductor switch, this may be the case when the depletion layer is destroyed. This is referred to as breakdown. The control device 22 is furthermore designed to short the shorting device of that DC voltage connection via which this faulty semiconductor switch is connected to the series connection. In that case, no current can flow from the DC link via the defective semiconductor switch, for example into a connected electrical load.

To detect the defective semiconductor switch, it is possible, by way of example, to a use a driver circuit, which is also referred to as a gate driver in the prior art. The driver circuit can be used to register an electrical voltage dropped across the semiconductor switch. If a voltage value of this voltage is lower than a predetermined threshold value, even though a switching signal is meant to switch the semiconductor switch to an off state, then it can be assumed that the semiconductor switch remains uncontrollably permanently in an electrically conductive state. Alternatively, the switch voltages of the nondefective semiconductor switches can likewise be used to identify a permanently on semiconductor switch, since the resultant short-circuit current brings about a voltage increase.

According to one development, the positive line and the negative line in the DC link are connected via a battery. In this case, battery means an electrical storage battery that can absorb and output electric power and that can buffer-store energy. This development has the advantage that one and the same battery without changeover mechanisms, such as a contactor, for example, can be used by all rectifiers and all inverters in order to store energy.

The rectifiers and/or the inverters preferably have a respective dedicated smoothing capacitor. This splits the voltage of the DC link over the rectifiers and inverters and forms local DC links.

One development prevents the shorting of the DC voltage connections from also involving e.g. the smoothing capacitor or half-bridges inside the rectifier or inverter likewise being shorted. This development provides for at least one of the DC voltage connections to have a decoupling circuit. The decoupling circuit may be provided by a semiconductor switch S2. The decoupling circuit is designed to block a current between the DC voltage connection and the half-bridges of the rectifier or inverter at least unidirectionally. The blocking is unidirectional in the case of a semiconductor switch with a diode. The decoupling circuit may also be designed to block a current between a smoothing capacitor and the DC voltage connection at least unidirectionally.

One development makes use of the fact that in the case of a rectifier or in the case of an inverter, the DC voltage connection can have both a shorting circuit and a decoupling circuit. In the case of this development, a control device is designed to bring about a step-up converter mode or a step-down converter mode for the respective rectifier or inverter that has the DC voltage connection by alternately connecting the decoupling circuit and the shorting circuit. As a result, the partial voltage provided by a rectifier can advantageously be matched to the DC voltage in the DC link. Equally, a voltage dropped across the smoothing capacitor can be adjusted independently of the DC voltage of the DC link.

The invention also includes an aircraft. The aircraft is particularly a fixed-wing aircraft. The aircraft is an electrically driven aircraft, i.e. an ePlane. The aircraft has an electric drive mode for driving a propeller of the aircraft. The drive motor is coupled to an electric generator via a converter. The converter is an embodiment of the converter according to the invention. The generator may be, by way of example, driven by an internal combustion engine, i.e. a gasoline engine or a diesel engine or a turbine. If the aircraft is embodied as a rotary-wing aircraft, then the rotor of the aircraft is the propeller. The aircraft according to the invention results in the advantage that no complex interconnection of the rectifiers and inverters of the converter via contactors is necessary in order to provide a redundant converter. This allows the aircraft to be of particularly lightweight and compact design.

One development provides for the generator to have at least two independent polyphase coil arrangements, for example at least two independent three-phase coil arrangements. Each of the polyphase coil arrangements is in this case connected to a different rectifier of the converter. In the case of this development, the polyphase coil arrangements are arranged in the same generator, i.e. in the same stator of the generator. Each coil arrangement is in this case designed to provide or produce a respective input AC voltage for the respective rectifier in multiple AC voltage lines. This development has the advantage that the aircraft is also a redundant design at the generator end, without this requiring multiple generators.

One development accordingly provides for the drive motor to have at least two independent polyphase coil arrangements and for each of the polyphase coil arrangements to be connected to a different inverter of the converter. In other words, a stator of the drive motor has multiple independent polyphase coil arrangements, for example three-phase coil arrangements. This development results in the advantage that with only a single drive motor, a redundant drive for the propeller is still provided.

If a coil arrangement of the generator or of the drive motor is defective, then the relevant rectifier or inverter can be decoupled from the converter by activating the shorting circuit of the converter for this rectifier or inverter.

BRIEF DESCRIPTION OF THE DRAWINGS

Exemplary embodiments of the invention are described below. In this regard:

FIG. 5 shows a schematic representation of an embodiment of the aircraft according to the invention.

DETAILED DESCRIPTION OF THE EMBODIMENTS

The exemplary embodiments explained below are preferred embodiments of the invention. In the exemplary embodiments, the described components of the embodiments are respective individual features of the invention that can be considered independently of one another and that each also develop the invention independently of one another and hence can also be regarded as part of the invention individually or in a combination other than that shown. Furthermore, the embodiments described are also augmentable by further instances of the already described features of the invention.

In the Figures, elements having the same function are each provided with the same reference symbols.

Figure 1:
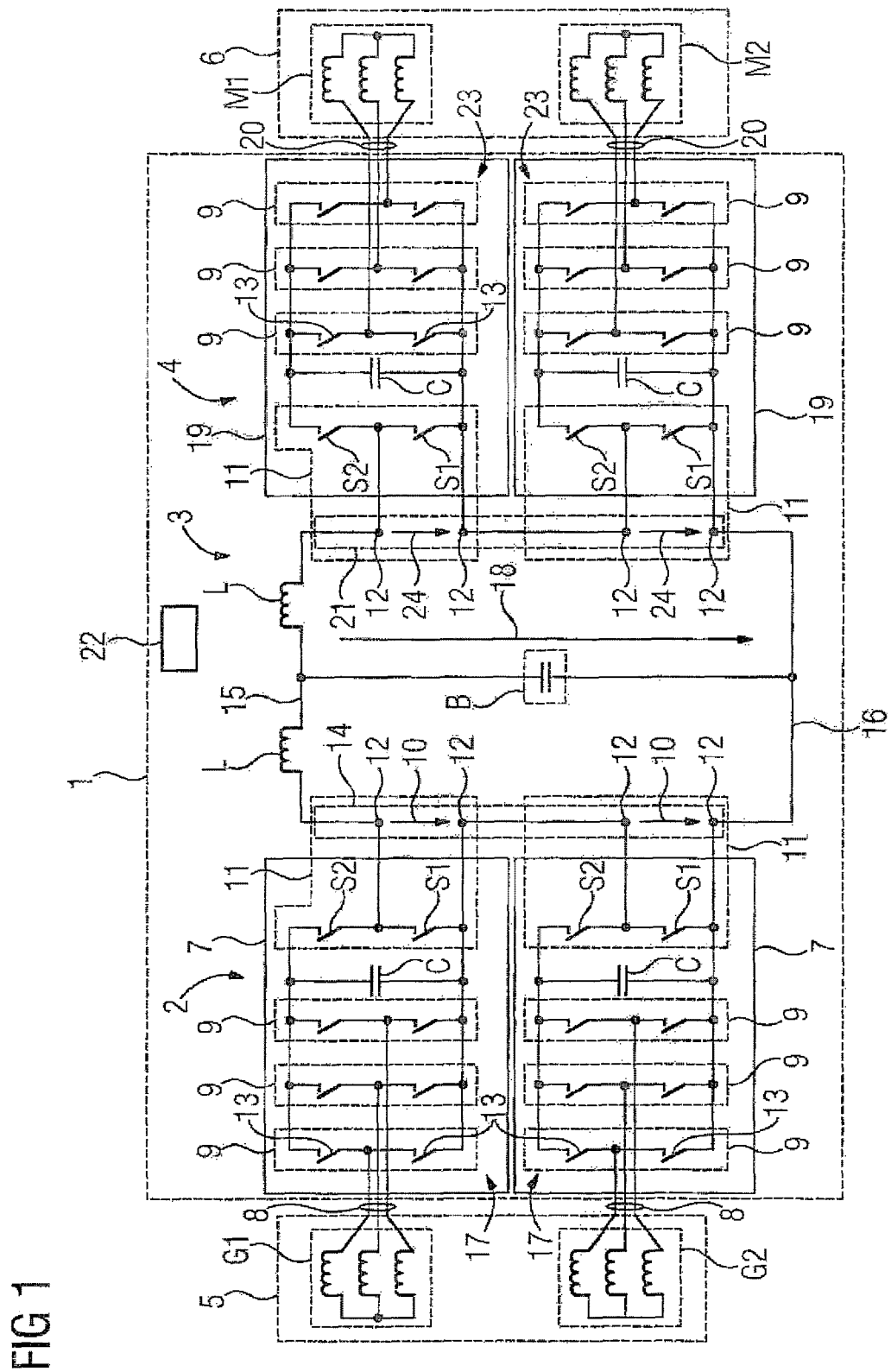
FIG. 1 shows a schematic representation of an embodiment of the converter according to the invention.

FIG. 1 shows a converter 1 with a rectifier arrangement 2, a DC link 3 and an inverter arrangement 4. Via the converter 1, an electric generator 5 and an electric drive motor 6 may be coupled to or interconnected with one another. The arrangement shown in FIG. 1, may, by way of example, be provided in an electrically driven aircraft. The drive motor 6 can be used to drive a propeller of the aircraft. The generator 5 can, by way of example, be driven by an internal combustion engine (not represented).

The rectifier arrangement 2 of the converter 1 has, in the example shown in FIG. 1, two rectifiers 7 that can have the same design. Each rectifier 7 may be electrically coupled to a generator coil system G1, G2 of the generator 5 via AC voltage lines 8. The generator coil systems G1, G2 are two mutually insulated winding systems for respectively producing a polyphase rotary current, for example a three-phase rotary current. The generator coil systems G1, G2 are each a polyphase coil arrangement. The two generator winding systems G1, G2 may also be provided by two different generators.

Each rectifier 7 may have, in a manner which is known per se, half-bridges 9 in order to use a respective half-bridge 9 to convert the input AC voltage received via one of the AC voltage lines 8 into a partial voltage 10 in a manner which is known per se. The partial voltage 10 is a DC voltage. The partial voltage 10 can be produced or provided at a DC voltage connection 11 connection contacts 12. In FIG. 1, the rectifiers 7 are in the form of active rectifiers. The half-bridges 9 of the active rectifiers 7 have semiconductor switches 13, only some of which are provided with a reference symbol in FIG. 1 for the sake of clarity. Each rectifier 7 may furthermore have the smoothing capacitor C across which a partial voltage of the DC link 3 is dropped.

In the case of the rectifier arrangement 2, the DC voltage connections 11 are connected together to form a series connection 14. The series connection 14 connects a positive line 15 and a negative line 16 of the DC link 3 to one another.

In the case of each rectifier 7, a semiconductor switch S1 is provided that can be used to connect the respective rectifier 7 to the series connection 14 or to render it ineffective in the series connection 14 on the basis of a control signal. To this end, the connection contacts 12 are interconnected via the semiconductor switch S1.

The semiconductor switch S1 is a shorting circuit for the DC voltage connection 11. Closing the semiconductor switch S1 shorts the connection contacts 12 of the DC voltage connection 11. As a result, the rectifier 7 is ineffective in the series connection 14. Opening the semiconductor switch S1 allows the partial voltage 10 to be provided between the connection contacts 12.

The DC voltage connection 11 may furthermore have a semiconductor switch S2, which is a decoupling circuit. The semiconductor switch S2 connects one of the connection contacts 12 to the half-bridges 9. Furthermore, the semiconductor switch S2 interconnects the smoothing capacitor C with one of the connection contacts 12. Opening the semiconductor switch S2 blocks, or, if a diode is present, unidirectionally blocks, a flow of current between the half-bridges 9 and the connection contact 12. Equally, a flow of current is blocked between the smoothing capacitor C and the connection contact 12. Closing the semiconductor switch S2 connects the half-bridges to the connection contact 12. The same applies to the smoothing capacitor C.

The semiconductor switches 13 and the semiconductor switches S1, S2 may be configured as a respective IGBT or MOSFET. The semiconductor switches S1, S2 particularly do not have to be contactors. The semiconductor switches 13, S1, S2 may be provided as semiconductor modules or, for short, submodules 17, as such may be arranged on a common semiconductor substrate, for example.

The series connection 14 sums the partial voltages 10 to form a DC voltage 18 that is provided in the DC link 3 between the positive conductor 15 and the negative conductor 16. The positive conductor 15 and the negative conductor 16 may each be provided by a wire or a bus bar, for example. To store electric power, the DC link 3 may have a battery B, for example an electrochemical storage battery having galvanic cells. The battery B does not have to perform voltage smoothing for the DC voltage 18, since the rectifiers 7 have dedicated smoothing capacitors C. The DC link 3 may furthermore have inductors L provided in it, for example electric coils.

The drive motor 6 may likewise have two separate motor coil systems M1, M2. The motor coil systems M1, M2 are each a polyphase coil arrangement. The motor coil systems M1, M2 may also be provided in different drive motors.

In the example shown in FIG. 1, the inverter arrangement 4 has two inverters 19, each of which is interconnected with another of the motor coil systems M1, M2 via respective AC voltage lines 20. The inverters 19 may be of the same design as the rectifiers 7. The inverters 19 can be operated as pulse-controlled inverters. To this end, they have half-bridges 9 with semiconductor switches 13. Only some of the semiconductor switches 13 of the inverters 9 are provided with a reference symbol for the sake of clarity. Each inverter 19 can have a smoothing capacitor C.

The inverters 19 are interconnected with the DC link 13 via a respective DC voltage connection 11, connection contacts 12 of the DC voltage connections 11 being interconnected to form a series connection 21. The connection contacts 12 of the inverters 19 have a respective partial voltage 24 of the DC voltage 18 dropped between them.

The DC voltage connections 11 of the inverters 19 can have a respective semiconductor switch S1 that forms a shorting circuit for the connection contacts 12. Furthermore, a semiconductor switch S2 may be provided that provides a decoupling circuit that can bring about a flow of current between one of the connection contacts 12 and the half-bridges 13 and/or the smoothing capacitor C by virtue of the semiconductor switch S2 being closed. To this end, the connection contact 12 and the half-bridges 13 and/or the smoothing capacitor C are interconnected via the semiconductor switch S2.

The smoothing capacitors C are each a local DC link capacitor.

The converter 1 can have a control device 22 that can switch semiconductor switches 13, S1, S2, so that they change between an electrically conductive state and an electrically inhibiting state. The semiconductor switches 13, S1, S2 of the inverters 19 may be provided in a respective inverter 19 by a submodule 23 that may be formed, by way of example on the basis of a common semiconductor substrate. The control device 22 may be formed, by way of example, on the basis of a microprocessor or microcontroller. The control device 22 may be distributed at least in part over the half-bridges 19. By way of example, they can comprise driver circuits of the semiconductor switches 13 of the half-bridges 9.

The series connection 14 connects the rectifiers 7 in series. The active rectifiers 7 are used to charge the smoothing capacitors C. The partial voltage 10 of a smoothing capacitor C can be adjusted by means of the generator windings of the generator coil systems G1, G2 and appropriate clocking of the active rectifiers 7. The switches S1, S2 can be used to connect the rectifiers 7 in parallel with the battery. This allows the battery to be charged. In this case, the following switching combinations arise:

In the case of each inverter 7, by opening S1 and closing S2, the respective generator coil system G1 or G2 can be connected to the battery B. By closing S1 and opening S2, the respective generator coil system G1, G2 can be isolated from the battery B. The partial voltages 10 in the rectifiers 7 may be greater in total than the battery voltage of the battery B. Without step-down converter mode, however, they must correspond in total to at least the battery voltage. Should both rectifiers 7 be in operation, then the partial voltage 10 of the two rectifiers is preferably of the same magnitude.

In the case of the inverters 19 too, multiple switching options arise on the basis of the semiconductor switches S1, S2 of the DC voltage connections 11 of the inverters 19. The motor coil systems M1, M2 are driven by means of a respective one of the inverters 19. Each inverter 19 is a pulse-controlled inverter in this case. The semiconductor switches S1, S2 can be used to connect the inverters 19 to the battery B or to isolate them therefrom. The battery voltage corresponds to the DC voltage 18.

The partial voltages 24 of the smoothing capacitors C in the inverters 19 may be greater in total than the battery voltage. They must correspond in total to at least the battery voltage, however, if there is no provision for a step-up converter during operation.

Should both inverters 19 be in operation, then the respective partial voltage 24 of the two inverters is preferably of the same magnitude.

The switching options described result in the following methods of operation of the converter that are able to be selected by the control device 22, for example.

In one method of operation, operation of only one rectifier 7 and of only one inverter 19 is possible. The other rectifiers 7 and inverters 19 are isolated from the circuits by closure of the semiconductor switches S1. This results in a cold redundancy in the converter 1. That is to say that in the event of a fault, the switch S1 is opened and S2 is closed, which charges the hitherto unprovisioned smoothing capacitors C. In other words, the remaining rectifiers or inverters are connected to the series connection 14, 21.

A further method of operation involves all rectifiers 7 and all inverters 19 being connected to the circuit, that is to say to the respective series connection 14, 21 (hot redundancy), via open semiconductor switches S1 and closed semiconductor switches S2.

Between cold redundancy and hot redundancy, there are also intermediate forms possible when there are more than two rectifiers/inverters.

A further method of operation involves all rectifiers 7 and all inverters 19 being in operation, with clocking of the semiconductor switches S1, S2 being performed. All rectifiers and inverters are connected to the circuit via respective open semiconductor switches S1 and closed semiconductor switches S2 with alternate clocking of S1 and S2 in a step-up converter mode or a step-down converter mode. The individual rectifiers 7 are preferably clocked in staggered fashion in their half-bridges 9 in order to reduce a current ripple in the inductors L.

In the event of a fault in one of the rectifiers 7 or inverters 19, it is possible for the control device, for example, to perform the following method. In the event of a fault in a rectifier or an inverter, the semiconductor switch S1 thereof can be closed, as a result of which the faulty circuit portion is isolated from the supply circuit, i.e. the DC link 3.

Furthermore, in the event of a faulty inverter 19, discharge of the smoothing capacitor C can be followed by the semiconductor switches 13 of the half-bridges 9 being opened. The supply circuit is not interrupted during their method for the other rectifiers and inverters.

As an alternative to the semiconductor switch S1, it is also possible for the semiconductor switch S2 together with a half-bridge 9 of an inverter 19 to short this inverter on the input side, i.e. to short the connection contacts 12. The closed half-bridge 9 is then the shorting circuit for this inverter.

Figure 2:
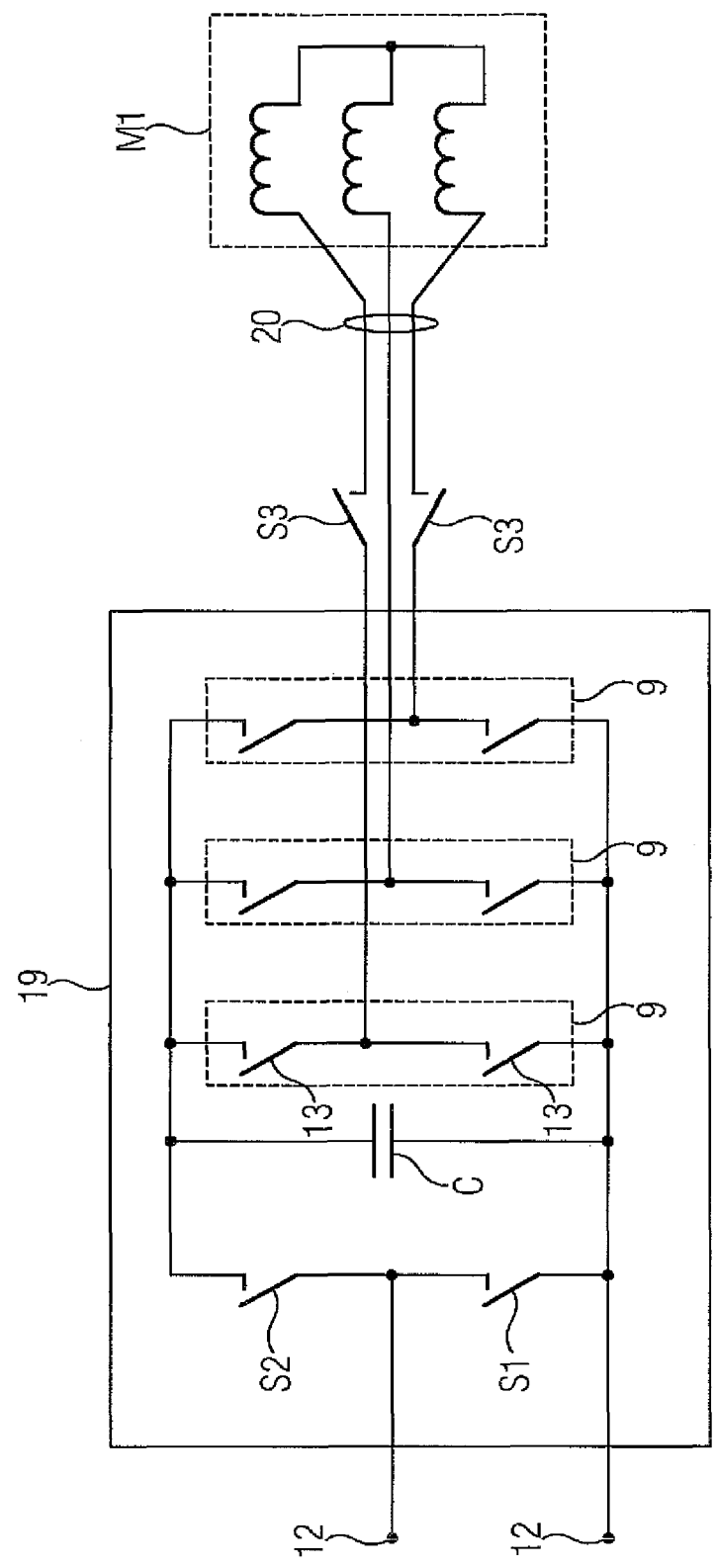
FIG. 2 shows a schematic representation of a shorting circuit according to an embodiment of the converter according to the invention.

Further switching elements can provide additional protection in the event of a fault. In this regard, FIG. 2 shows a solution to the problem that the diodes (not represented in FIG. 2) connected in parallel besides an IGBT mean that, in the event of a permanent short in an IGBT, the directly connected winding of a motor coil system is shorted. This gives rise to losses in the drive motor. The same applies to a generator. FIG. 2 shows the solution only for an inverter 19. This can also take place analogously in the case of a rectifier 7.

If the permanent short via one of the semiconductor switches 13 is undesirable, then the motor coil system M1 can be isolated from the inverter 19 or active rectifier 7 by means of two additional semiconductor switches S3 per inverter or rectifier by switching at the current zero crossing. The additional semiconductor switches S3 are closed during operation of the converter 1 (called "normally on"). The semiconductor switches S3 are used to prevent a shorted winding in the event of a fault in one of the half bridges 9 when one of the semiconductor switches 13 is continuously in the electrically conductive state.

The converter 1 has the overall result of a circuit topology for a modular high-frequency converter for meeting redundancy demands in an electrically driven aircraft. It is possible to use submodules 17, 23 of the same design for connecting the generator and the motor to the battery B. FIG. 1 shows how dual redundancy can be provided without contactors.

Figure 3:
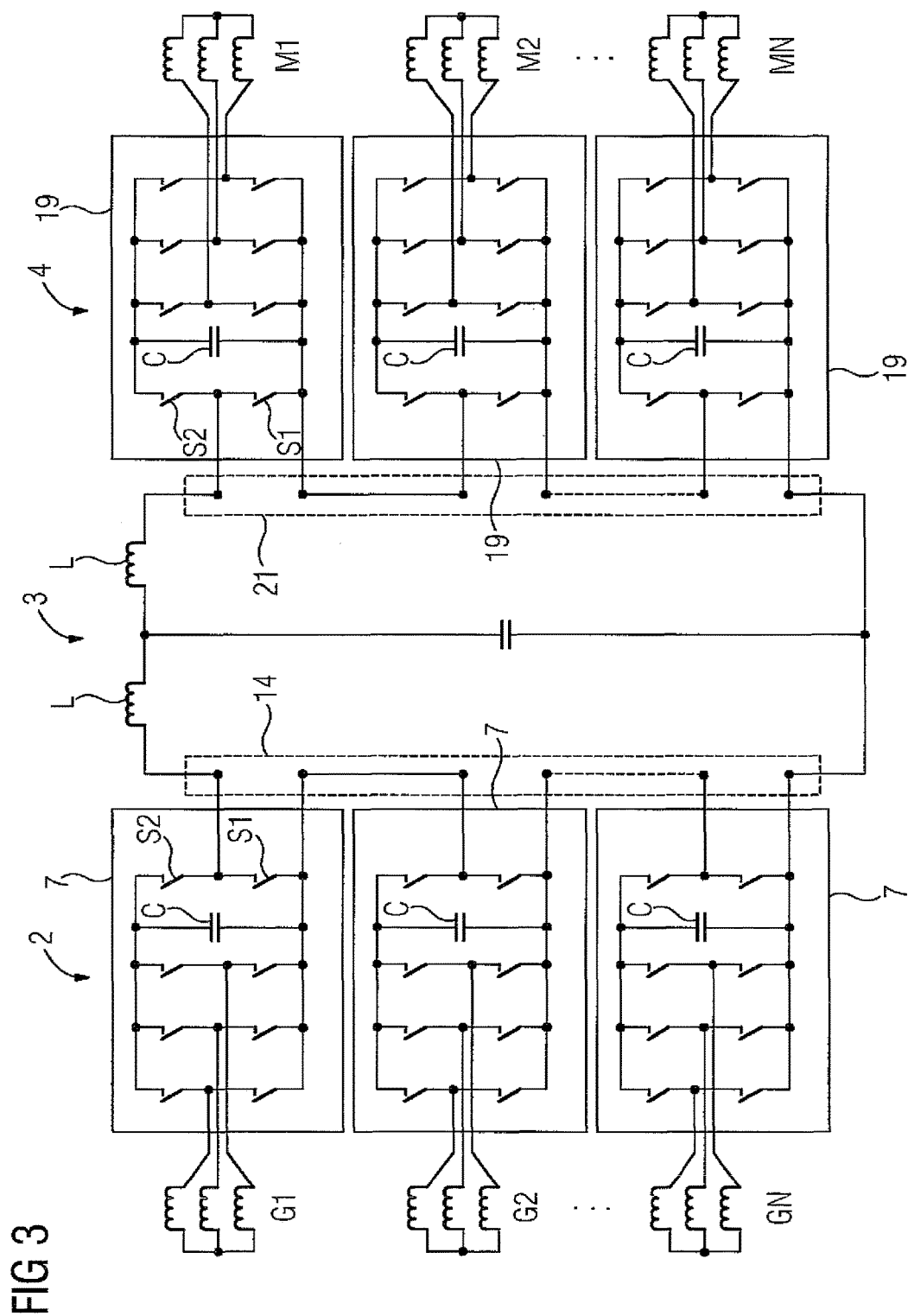
FIG. 3 shows a schematic representation of a further embodiment of the converter according to the invention.

In this regard, FIG. 3 shows how the topology can be extended to any desired number of submodules by virtue of the rectifier arrangement 2 and the inverter arrangement 4 having a total of N rectifiers 7 and N inverters 19. In this case, N is an integer greater than 1.

Figure 4:
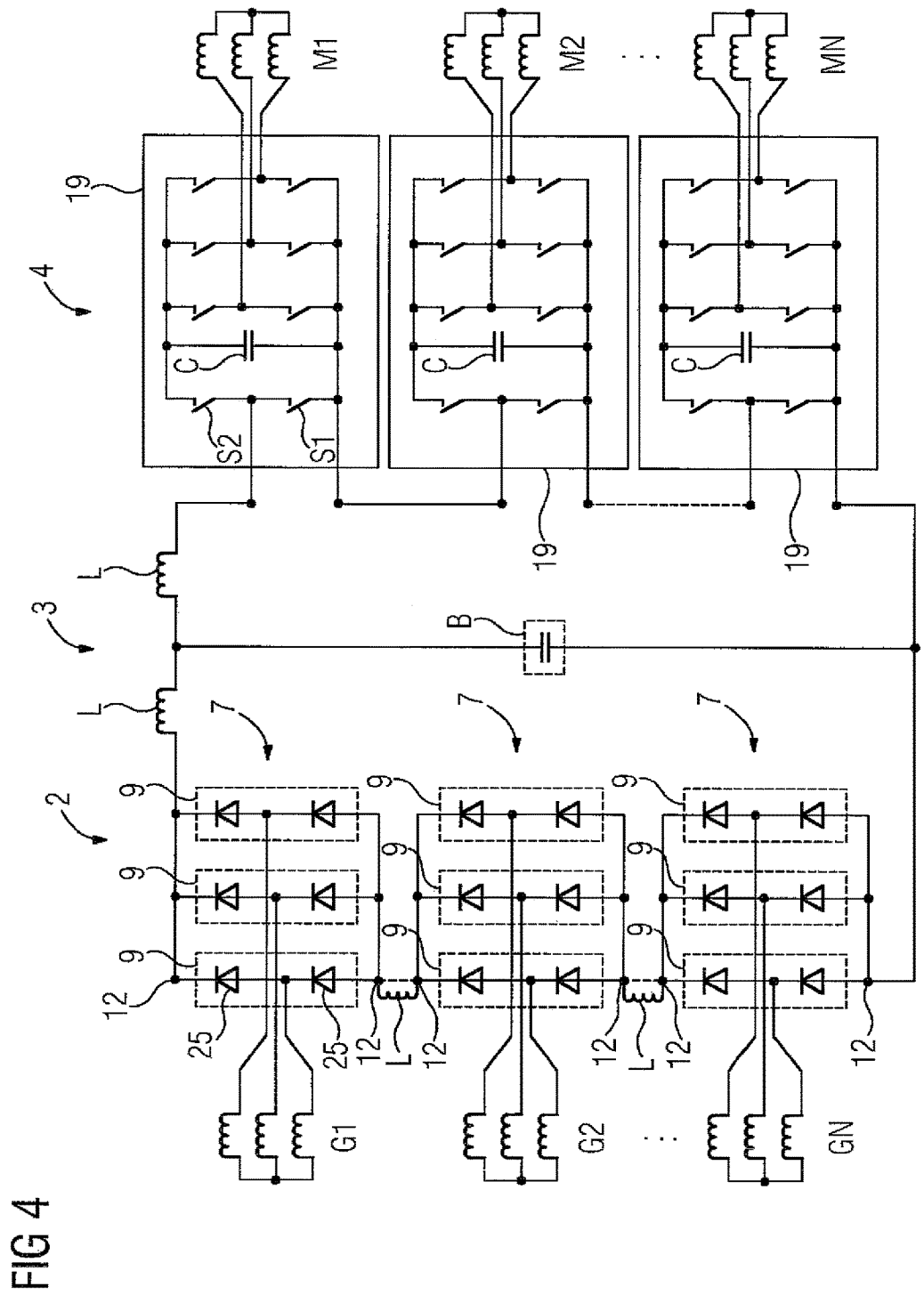
FIG. 4 shows a schematic representation of a further embodiment of the converter according to the invention with passive rectifiers.

FIG. 4 illustrates how, by modifying the converter 1, the rectifiers 7 can be reduced to a respective passive rectifier for which, instead of the semiconductor switches 13 in the half bridges 9, diodes 25 are provided. For the sake of clarity, only some diodes 25 are provided with a reference symbol in FIG. 4. In this case, the half bridges 9 themselves are each a shorting circuit for bypassing the respective generator coil systems G1, G2, GN. The generator coil systems G1, G2, GN may in this case each, as illustrated in FIG. 2, be interconnected with the diode rectifiers via switches S3.

FIG. 5 illustrates how the converter 1 may be provided by way of example in an aircraft 26. FIG. 4 shows a fixed-wing aircraft 26 in which a propeller 27 can be driven by the drive motor 6. The propeller 27 is rotated about a shaft 28 by the drive motor 6. In the example, the drive motor 6 is an electric machine that is operated in motor mode. The power for driving the propeller 27 can be obtained by virtue of an internal combustion engine 29, which may be a gasoline engine or a diesel engine or a turbine, for example. The internal combustion engine 29 can use a shaft 30 to drive the generator 5. The electric generator provided may be an electric machine in generator mode. A speed of the shaft 30 is independent of a speed of the shaft 28 in this case. In this regard, the AC voltage produced by the generator 5 is converted by means of the converter 1, in the manner described, into AC voltage that can be supplied to the drive motor 6 via the AC voltage phase conductors 9. A switching frequency for the inverters 7 is selected by the control device 22 on the basis of a rated speed of the propeller 27 in this case. The rated speed can in this case be selected or prescribed by a pilot, for example, by means of an operating element (not shown).

Overall, the example shows how the invention can provide a redundant circuit topology for an ePlane converter without contactors.

What is claimed is:

1. A converter comprising:
    a DC link for providing a DC voltage between a positive line and a negative line;
    a battery connecting the positive line and the negative line in the DC link;
    at least two rectifiers connected to the DC link for producing the DC voltage from polyphase input AC voltages by DC voltage connections of the rectifiers, said DC voltage connections of the rectifiers being interconnected so as to form a first series connection;
    at least two inverters connected to the DC link for producing polyphase output AC voltages to a connected load from the DC voltage by DC voltage connections of the inverters, said DC voltage connections of the inverters being interconnected so as to form a second series connection, said positive line and said negative line of the DC link having their input sides connected to one another via the first series connection and said positive line and said negative line of the DC link having their output sides connected to one another via the second series connection; and
    a short circuit in at least one of the DC voltage connections of the rectifiers or inverters for short-circuiting connection contacts by which the DC voltage connections of the rectifiers and the inverters are connected to the first and second series connections,
    wherein the short circuit of at least one of the at least two inverters is formed by connecting the connection contacts of the at least one inverter by shorting second semiconductor switches of a half-bridge producing one of the polyphase output AC voltages, wherein a current to the load generated by the polyphase AC output voltages is blocked by a third semiconductor switch disposed between an polyphase AC output of the at least one inverter and the load when the second semiconductor switches are shorted.

2. The converter of claim 1, wherein the short circuit in at least one of the DC voltage connections of the rectifiers or inverters is formed by a first semiconductor switch which connects the connection contacts.

3. The converter of claim 2, wherein each of the first, second and third semiconductor switches is formed by an IGBT or a MOSFET.

4. The converter of claim 1, wherein at least one of the rectifiers and/or at least one of the inverters has the half-bridge with the second semiconductor switches, said converter further including a control device configured to detect a defective second semiconductor switch in the half-bridge such that the half-bridge remains permanently in an electrically conductive state, said control device further configured to activate the short circuit of a DC voltage connection which has the defective second semiconductor switch, said defective second semiconductor switch being connected by the DC voltage connection to one of the first or second series connections.

5. The converter of claim 4, wherein at least one of the DC voltage connections of the rectifiers or inverters has a decoupling circuit interconnected between one of the connection contacts of the DC voltage connections and the half-bridge of the rectifiers or inverters, said decoupling circuit being configured to block a current.

6. The converter of claim 5, wherein the control device is configured to provide a step-up converter mode or a step-down converter mode for the DC voltage connections which have both a short circuit and a decoupling circuit by alternately connecting the decoupling circuit and the short circuit.

7. The converter of claim 1, wherein the rectifiers and/or the inverters have each a smoothing capacitor.

8. An aircraft, comprising:
    a polyphase electric drive motor for driving a propeller of the aircraft;
    a polyphase electric generator; and
    a converter configured to couple the electric generator to the electric drive motor, said converter including a DC link for providing a DC voltage between a positive line and a negative line, a battery connecting the positive line and the negative line in the DC link, at least two rectifiers connected to the DC link for producing the DC voltage from polyphase input AC voltages received from the polyphase electric generator by DC voltage connections of the rectifiers, said DC voltage connections of the rectifiers being interconnected so as to form a first series connection, at least two inverters connected to the DC link for producing polyphase output AC voltages for the polyphase electric drive motor connected to the inverters from the DC voltage by DC voltage connections of the inverters, said DC voltage connections of the inverters being interconnected so as to form a second series connection, said positive line and said negative line of the DC link having their input sides connected to one another via the first series connection and said positive line and said negative line of the DC link having their output sides connected to one another via the second series connection, and a short circuit in at least one of the DC voltage connections of the rectifiers or inverters for short-circuiting connection contacts by which the DC voltage connections of the rectifiers and the inverters are connected to the first and second series connections,
    wherein the short circuit of at least one of the at least two inverters is formed by connecting the connection contacts of the at least one inverter by shorting second semiconductor switches of a half-bridge producing one of the polyphase output AC voltages, wherein a current to the polyphase electric drive motor generated by the polyphase AC output voltages is blocked by a third semiconductor switch disposed between an polyphase AC output of the at least one inverter and the polyphase electric drive motor when the second semiconductor switches are shorted.

9. The aircraft of claim 8, constructed as a fixed-wing aircraft.

10. The aircraft of claim 8, wherein the generator has at least two independent polyphase coil arrangements, said polyphase coil arrangements being connected to a different one of the rectifiers of the converter.

11. The aircraft of claim 8, wherein the electric drive motor has at least two independent polyphase coil arrangements, said polyphase coil arrangements being connected to a different one of inverters of the converter.

* * * * *